United States Patent
Anatoly

(10) Patent No.: US 7,987,054 B2
(45) Date of Patent: Jul. 26, 2011

(54) EFFICIENT MULTIPLE PREDICTION IN TWO AND THREE DIMENSIONS

(75) Inventor: Baumstein I. Anatoly, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 260 days.

(21) Appl. No.: 12/367,387

(22) Filed: Feb. 6, 2009

(65) Prior Publication Data
US 2009/0288823 A1  Nov. 26, 2009

Related U.S. Application Data

(60) Provisional application No. 61/128,698, filed on May 23, 2008.

(51) Int. Cl.
*G01V 1/28* (2006.01)
(52) U.S. Cl. .......................... 702/17; 367/38
(58) Field of Classification Search ............ 73/382 G; 166/250.16; 367/38, 48, 53, 73; 702/14, 702/17
See application file for complete search history.

(56) References Cited

U.S. PATENT DOCUMENTS

| | | | |
|---|---|---|---|
| 4,244,223 A * | 1/1981 | Geiger | 73/382 G |
| 4,398,273 A * | 8/1983 | Thompson et al. | 367/73 |
| 4,887,243 A | 12/1989 | Pann | 367/48 |
| 7,181,347 B2 | 2/2007 | Moore | 702/14 |
| 7,197,399 B2 | 3/2007 | Matson et al. | 702/17 |
| 2006/0015259 A1 * | 1/2006 | Gulunay | 702/14 |
| 2006/0098529 A1 * | 5/2006 | Anderson et al. | 367/38 |
| 2007/0073488 A1 | 3/2007 | Moore | 702/14 |

FOREIGN PATENT DOCUMENTS

| | | |
|---|---|---|
| WO | WO 2005/103764 | 11/2005 |
| WO | WO 2005/103765 | 11/2005 |

OTHER PUBLICATIONS

Baumstein et al. (2003), "Wavefield extrapolation in laterally varying VTI media," 73rd Annual International Meeting, SEG, *Expanded Abstracts*, pp. 945-948.
Beasley et al. (1992), "Equalization of DMO for irregular spatial sampling, 54th Mtg.," *Eur. Assn. of Expl. Geophys.*, pp. 232-233.
Dragoset et al. (1998), "Some remarks on surface multiple attenuation," *Geophysics* 63, pp. 772-789.

(Continued)

*Primary Examiner* — Jack Keith
*Assistant Examiner* — Daniel L Murphy

(57) ABSTRACT

A method is disclosed that uses (a) source-receiver reciprocity and (b) a method such as ISR DMO (U.S. Patent Application Publication No. 2006/0098529) that allows reconstruction of densely sampled gathers at arbitrary surface locations, to efficiently predict multiple reflections, either surface related or interbed multiples, in seismic data. For each reconstructed gather and each output (field) trace, two traces are extracted corresponding to the field source and receiver positions of the output trace, then they are convolved and the convolution result is added (summed) to that obtained by applying this procedure to previously reconstructed gathers. The efficiency results from the fact that the convolutions are performed by looping over all traces for each "bounce" point, with the outer loop being over bounce points. Once all the reconstructed gathers are processed, multiple predictions are obtained for the whole survey by conventional means.

13 Claims, 7 Drawing Sheets

OTHER PUBLICATIONS

Hennenfent et al. (2005), "Sparseness-constrained data continuation with frames: applications to missing traces and aliased sigials in 2/3-D," *SEG Expanded Abstracts* 24, pp. 2162-2163.

Jakubowicz (1998),"Wave equation prediction and removal of interbed multiples," 68th Annual International Meeting, SEG, *Expanded Abstracts*, pp. 1527-1530.

Ross et al. (1987), "Vertical seismic profile reflectivity—Ups over downs (short note)," *Geophysics* 52, pp. 1149-1154.

van Dedem et al. (2005), "3D surface multiple prediction using sparse inversion," *Geophysics* 70, pp. V31-V43.

van Waveren et al. (1995), "Parallelisation of surface-related multiple elimination," Springer Berlin / Heidelberg, *High-Performance Computing and Networking* 919, pp. 156-163.

Xu et al. (2005), "Antileakage Fourier transform for seismic data regularization," *Geophysics* 70, pp. V87-V95.

* cited by examiner

EFFICIENT MULTIPLE PREDICTION IN TWO AND THREE DIMENSIONS

CROSS REFERENCE TO RELATED APPLICATION

This application claims the benefit of U.S. Provisional Patent Application 61/128,698, filed May 23, 2008, entitled EFFICIENT MULTIPLE PREDICTION IN TWO AND THREE DIMENSIONS, the entirety of which is incorporated by reference herein.

FIELD OF THE INVENTION

This invention relates to the field of geophysical prospecting and, more particularly, to seismic data processing. Specifically, the invention is a method for efficiently predicting both surface-related and internal multiples through convolution of data with itself. In the case of internal multiples, an efficient method is disclosed for reconstructing the data necessary for performing such convolutions.

BACKGROUND OF THE INVENTION

In seismic data acquisition, the seismic source is typically positioned at a selected shot location, and the seismic reflections of the shot are detected (the "shot record") by receivers also located at selected locations. Then, the source and receivers are moved to different locations and the process repeated, and in this manner a seismic survey is taken of a selected subterranean region. Ideally, for many seismic processing and interpretation objectives, the source and receiver locations would lie on a uniformly and densely sampled grid, but this is difficult to achieve in common industry practice for many reasons including surface obstructions, currents, cable feathering, and acquisition cost. Survey economics mandate that the spacings be as large as will still yield the required detail in the survey results. The desired seismic reflections are wavefields that reflect once from a subterranean interface between regions with different acoustic properties (such as the upper surface of a petroleum reservoir), and then travel back to the surface to be detected by a receiver. This desired data are often obscured by undesired multiple reflections of seismic rays. Multiple suppression techniques exist for reducing this noise problem. In Surface-Related Multiple Elimination (SRME), multiple reflection that have at least one downward reflection from the free surface (interface between air and water or air and land) are predicted (see for example Dragoset, and Jericevic, "Some remarks on surface multiple attenuation," *Geophysics* 63, 772-789 (1998)). In contrast, Interbed (Internal) Multiple Elimination (IME) handles multiple reflections with downward reflections in the subsurface (see for example Jakubowicz, "Wave equation prediction and removal of interbed multiples," 68th Annual International Meeting, SEG, *Expanded Abstracts*, 1527-1530 (1998)). Some implementations of the latter algorithm require identification of strong reflectors that act as the main interbed multiple generators, which can be accomplished through an application of a VSP deconvolution technique described in Ross and Shah, "Vertical seismic profile reflectivity—Ups over downs (short note)," *Geophysics* 52, 1149-1154 (1987). Multiple predictions produced by SRME and IME are typically not accurate enough to be directly subtracted from the input multiple-contaminated data. Thus, an additional adaptive subtraction step is required, where predicted multiples are first shaped to better fit the actual multiples present in field data and then subtracted from the input data. Alternatively, multiples in field data can be attenuated based on their closeness to the shaped predicted multiples.

Data-driven multiple prediction methods (SRME and IME) require pair-wise convolution of densely and regularly sampled shot gathers centered at source and receiver positions for each trace. This requirement is the key contributor to the high computational cost of these methods. A straightforward implementation of SRME is illustrated in FIG. 1A and requires the following main steps:

1. Densely sampled shot gathers are reconstructed at each surface location where either a source or a receiver was present at any time during field acquisition. (The term "shot gather" describes a gather with an impulsive pressure source at the center of the gather with pressure sensors (receivers) all around it. Due to seismic reciprocity (i.e., the fact that recorded data would not change if we interchanged source and receiver positions), a "shot gather" can be also thought of as a "receiver gather" with a pressure sensor in the middle and impulsive pressure sources all around it.) In practice, a suitable grid is imposed, shot and receiver locations are assigned to gridpoints, and reconstruction is performed for each gridpoint in the grid. The reconstructed gathers are stored on disk.
2. For each trace, densely sampled gathers corresponding to the shot and receiver position of this trace are read from disk, their co-located traces are convolved with each other, and the convolution results are summed (stacked) to produce a single trace.
3. The convolution result (a single trace) contains the desired multiple prediction and is saved to disk.

FIG. 1A shows traces from two gathers, centered at the source (source positions are denoted by a star in the drawings) and receiver (denoted by a diamond), which are convolved at co-located bounce points (denoted by circles) and the results summed. These SRME implementations have been used successfully in 2D multiple prediction. 2D prediction typically considers only the data from a single CMP (common midpoint) line at a time. In contrast, 3D SRME requires simultaneous use of traces from many nearby CMP lines.

The main drawback of the method described above in the 3D case is the need to repeatedly read large amounts of data (each reconstructed shot gather can be as large as 1-3 Gb) from disk and the associated need to store all, or at least large portions of, the reconstructed data on disk (the total size of reconstructed data can reach hundreds of Tb for a typical 3D survey).

The difficulty of reconstructing and handling vast amounts of data involved has been recognized, and various ways of circumventing it have been proposed. Early attempts to improve efficiency of multiple prediction focused on parallelizing computation over temporal frequencies (see "Parallelisation of surface-related multiple elimination," van Waveren and Godfrey, Springer Berlin/Heidelberg, *High-Performance Computing and Networking* 919, 156-163 (1995)). Parallelizing is a necessary feature of most modern implementations of convolutional data-driven multiple prediction, but it does not resolve the problem of having to store and repeatedly access large volumes of data. Other authors circumvent the problem by not explicitly reconstructing the data. See for example van Dedem and Verschuur, "3D surface multiple prediction using sparse inversion," 71st Internat. Mtg. Soc. Expl. Geophys., *Expanded Abstracts*, 1285-1288 (2001). Their method attempts to recreate the missing data on-the-fly using certain assumptions about the character of the data. It requires higher than usual acquisition effort and does not work well with conventional streamer data. Moore et al. (PCT Patent Application Publication WO 2005/103764A1) also use on-the-fly data reconstruction by selecting the nearest (in terms of spatial location, offset, and azimuth) available field trace to compensate for missing data. This approach may prove to be inadequate in the presence of rapidly changing complex structure, where the nearest existing trace may not be a good approximation to the missing one. Matson et al. in U.S. Pat. No. 7,197,399 ("Method of multiple prediction") propose to reconstruct 3D multiple predictions from 2D predictions instead of reconstructing the data necessary to obtain the 3D predictions directly. This method requires the use of substantially different velocities for multiples of different orders and may be insufficiently accurate when multiples of different orders overlap. The latter is often the case, especially in interbed multiple prediction.

An improved method is needed to deal with the difficulty of reconstructing and handling vast amounts of data in 3D SRME or IME. The present invention satisfies this need.

SUMMARY OF THE INVENTION

In one embodiment the invention is a method for eliminating multiple reflections in data from a seismic survey, comprising:

(a) using the seismic data, reconstructing shot gathers of data at points on an (x,y) grid, said grid being selected with dense mesh spacing sufficient to distinguish potential locations of downward reflection points ("bounce" points) of multiple reflections;

(b) selecting a reconstructed gather corresponding to a bounce point, and a data trace in the survey data, then extracting two traces from the selected reconstructed gather corresponding to the source and receiver positions of the survey data trace, and convolving them, then repeating for each survey data trace within a selected aperture, thus performing pair-wise convolution of traces from a single reconstructed gather centered at a bounce-point location;

(c) repeating step (b) for each remaining bounce point, and summing the convolution result for each processed trace in the survey data; and (d) predicting multiple reflections in the survey data using the results of the preceding step.

BRIEF DESCRIPTION OF THE DRAWINGS

The present invention and its advantages will be better understood by referring to the following detailed description and the attached drawings in which:

FIGS. 6-11 illustrate the test example of the invention that is presented below, wherein FIG. 6 shows the input stack of synthetic model data;

FIG. 7 shows a shot record at the center of the model;

FIG. 8 shows a reconstructed (by the present inventive method) gather centered at the bounce point, located in the center of the model on the first interface (t=0.5 s);

FIG. 9 shows the stack of predicted multiples with bounce points at the first (t≈0.5 s interface) according to the present inventive method;

FIG. 10 shows the stack of predicted multiples with bounce points at the second (t≈1.0-1.5 s interface) according to the present inventive method; and FIG. 11 shows the stack after adaptive subtraction of predicted multiples.

Figure 1A:
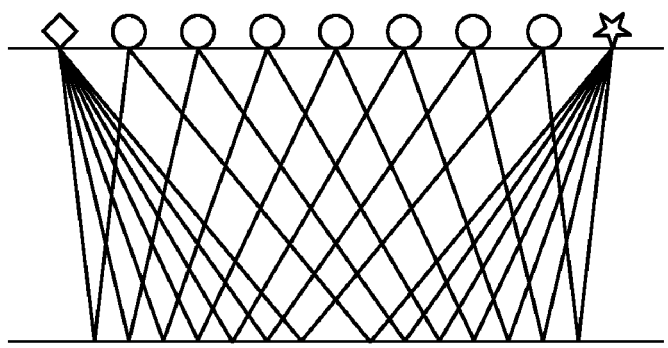
FIG. 1A illustrates traditional SRME methods.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

In one embodiment, the present inventive method includes the following basic steps:

1. Densely sampled gathers are reconstructed at all potential locations of downward reflection points of the multiples. In practice, this means that densely sampled gathers need to be reconstructed on a dense uniform surface grid (the same as in item 1 in the traditional SRME method outlined above).

2. For each reconstructed gather and each output (field) trace, two traces are extracted corresponding to the field source and receiver positions of the output trace, then they are convolved and the convolution result is added (sum) to that obtained by applying this procedure to previously reconstructed gathers.

3. Once all the reconstructed gathers are processed, multiple predictions are obtained for the whole survey.

A main advantage of the proposed procedure is that each reconstructed gather can be processed independently of all the other reconstructed gathers and therefore needs to be read from disk at most once or not stored on disk at all (note: in practice, it may be advantageous to store a small number of these gathers and perform convolutions for several of them at once, as discussed further below), thus eliminating the prohibitive requirement for storing and repeatedly accessing hundreds of Tb of data. This efficiency is achieved due to the fact that the number of surface locations (i.e., possible bounce points) is usually much smaller (by a factor of 100-500, which is the typical fold of 3D data) than the number of traces in a survey. In preferred embodiments of the invention such as the one illustrated in FIG. 5, the shot reconstruction (51) is performed using the ISR DMO method disclosed in U.S. Patent Application Publication No. 2006/0098529, which allows the reconstruction of densely sampled gathers at arbitrary surface locations. However, the invention is not limited to any particular technique for reconstructing the data. For example, f-k- or curvelet-domain sparsity-based reconstruction methods can be used to create the desired data (see Xu et al., "Antileakage Fourier transform for seismic data regularization," *Geophysics* 70, V87-V95 (2005); or Hennenfent and Herrmann, Sparseness-constrained data continuation with frames: applications to missing traces and aliased signals in 2/3-D, *SEG Expanded Abstracts* 24, 2162 (2005)).

Mathematically, the process described above relies on reciprocity and predicted multiples M can be expressed as follows:

$$M(x_S, y_S, x_R, y_R; t) =$$

$$\iiint G_1(x_S, y_S, x_B, y_B; \tau)G_2(x_R, y_R, x_B, y_B; t-\tau)dx_B dy_B d\tau =$$

$$\iiint G(x_B, y_B, x_S, y_S; \tau)G(x_B, y_B, x_R, y_R; t-\tau)dx_B dy_B d\tau$$

Where $G_1$, $G_2$, and G, and are the reconstructed gathers centered at the source (subscript S), receiver (subscript R), and bounce point (subscript B) locations respectively.

From a computational point of view, the order in which convolutions are performed can be rearranged. Instead of:
  loop over traces ($x_S$, $y_S$, $x_R$, $y_R$)
    loop over bounce points ($x_B$, $y_B$).
The present inventive method performs:
  loop over bounce points ($x_B$, $y_B$)
    loop over traces ($x_S$, $y_S$, $x_R$, $y_R$).

Figure 1B:
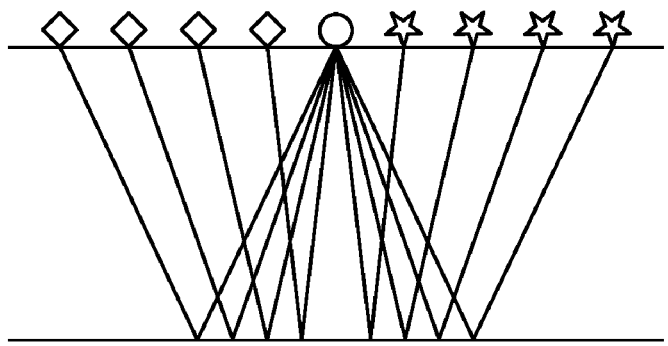
FIG. 1B illustrates the more computationally efficient SRME method of the present invention involving pair-wise convolution of traces from a single gather centered at the bounce point location.

Whereas the traditional approach is symbolically illustrated by FIG. 1A, the present inventive method is illustrated by FIG. 1B. The looping order for the present invention is illustrated in the flow chart of FIG. 5. There it is readily seen that for each bounce point being processed in block 51, the sum over all traces is performed in block 52. Thus, in the present invention, the inner loop (52) is over traces, and the outer loop (51) is over bounce points.

Figure 2A:
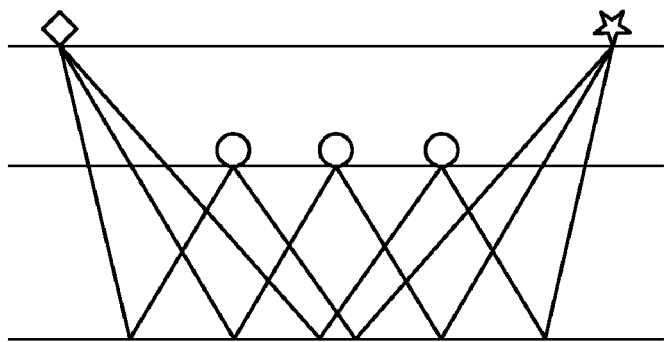
FIG. 2A illustrates traditional IME methods.
Figure 2B:
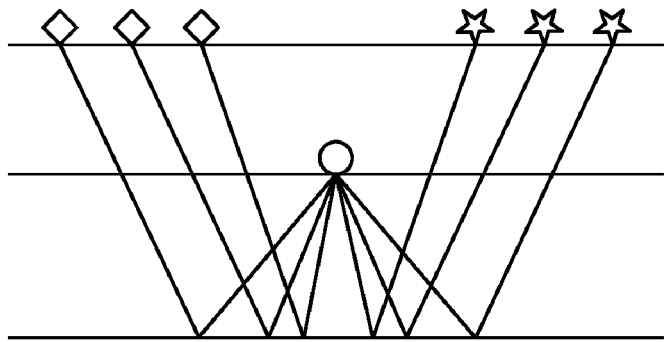
FIG. 2B illustrates the more computationally efficient IME method of the present invention involving pair-wise convolution of traces from a single gather centered at the bounce point location.

This methodology can be extended to the Interbed Multiple Elimination (IME). In its simplest implementation, IME is very similar to SRME, except for the fact that bounce points are located along a subsurface reflector, which has to be identified and digitized, rather than the free surface; see FIGS. 2A-B. FIG. 2A illustrates the straightforward (conventional) IME approach in which traces from two gathers, centered at the source (denoted by a star) and receiver (denoted by a diamond) are convolved at co-located bounce points (denoted by circles) along a multiple-generating horizon and the results summed. FIG. 2B illustrates the more computationally efficient method of the present invention, which involves pair-wise convolution of traces from a single gather centered at the bounce point location.

Figure 3:
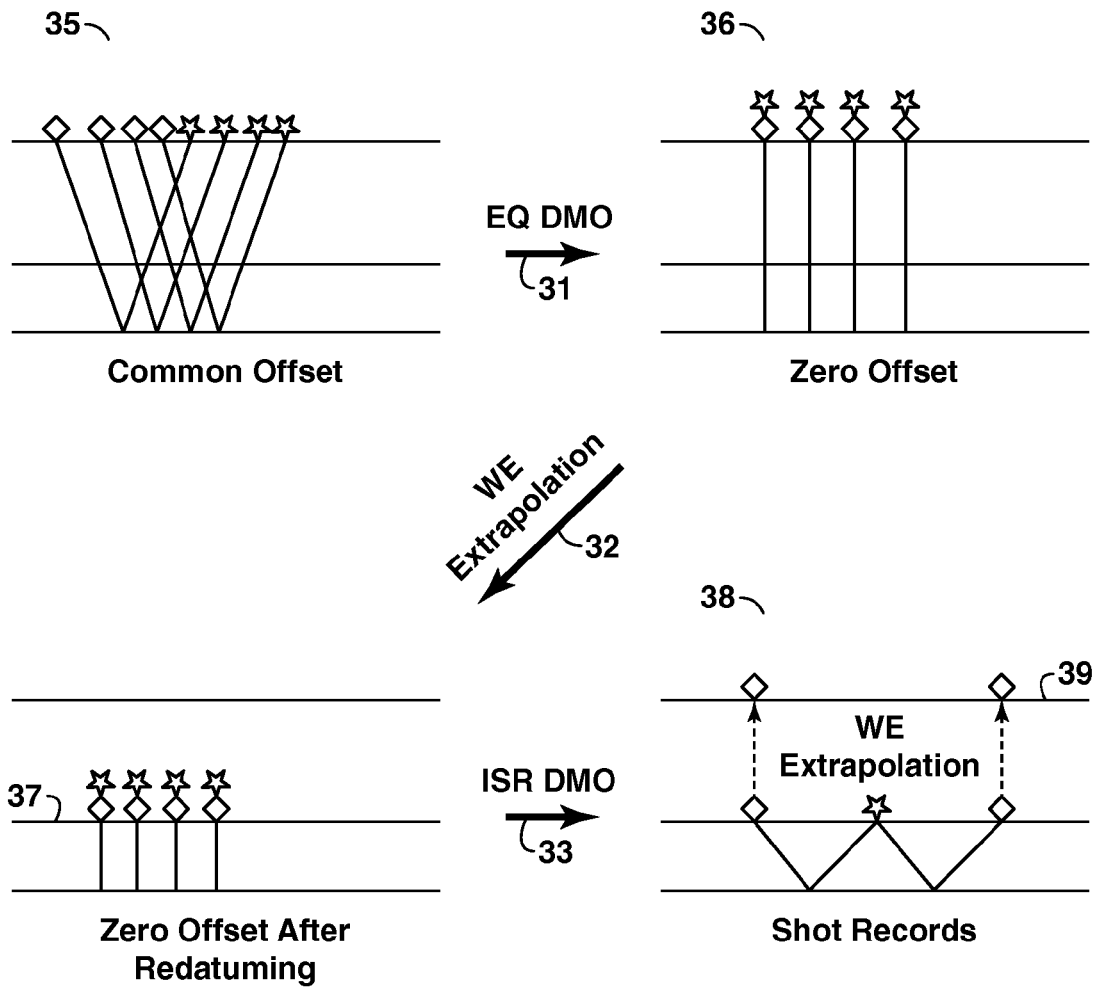
FIG. 3 is a schematic diagram illustrating data reconstruction procedure for IME according to one embodiment of the present invention.

Therefore, using the IME method of the present invention, the user would need to reconstruct (shot) gathers with the source located in the subsurface at a user-specified datum and densely sampled receivers on the surface. In one embodiment, the present invention uses the following cost-effective procedure for reconstructing such gathers (see FIG. 3):

1. Data are sorted into common offset cubes.

2. In step 31, each common offset gather 35 is mapped to zero offset 36, using, for example, the EQ DMO method (Beasley and Klotz, "Equalization of DMO for irregular spatial sampling, 54th Mtg.," *Eur. Assn. of Expl. Geophys.*, 232-233 (1992)).

3. Input to ISR DMO is formed as described in US 2006/0098529, a copy of which is incorporated herein by reference.

4. The resulting zero offset data are downward continued at step 32 to the desired datum 37 (which in general varies from bounce point to bounce point and should be located on a multiple-generating horizon), using for example zero offset wave equation extrapolation.

5. At step 33, ISR DMO is applied (as explained in US 2006/0098529) to reconstruct prestack densely sampled gathers with both sources and receivers at the desired datum.

6. Receivers are extrapolated back up to the surface at 38.

7. The resulting gathers are used to predict internal multiples for all traces falling within a desired aperture using a procedure identical to that described above for SRME.

It should be noted that the preceding numbered approach applies also to SRME if numbered items 4 and 6 are eliminated, i.e., numbered items 4 and 6 apply to IME only.

Next, some of the preceding steps will be discussed in more detail. The zero-offset downward continuation in step 32 can be performed with any suitable method. A wave equation-based technique (Baumstein and Anderson, "Wavefield extrapolation in laterally varying VTI media," 73rd Annual International Meeting, SEG, *Expanded Abstracts*, 945-948 (2003)) is noted above. This technique can be sped up computationally by performing the downward extrapolation in a single step.

The application of ISR DMO in step 33 involves Reverse NMO with an RMS velocity that depends on the datum (selected reference level or depth) and needs to be computed from the interval velocity. Since, in general, different bounce points are located at different depths, this velocity has to be recomputed for each reconstructed gather.

Receiver extrapolation at 38 is performed using the wave-equation-based approach from step 32. It may be noted that consistent with the present invention's approach to IME, all receivers in a reconstructed shot gather are continued up to the same datum (the free surface 39), whereas in the traditional approach it would have been necessary to downward continue them to different depths, depending on horizons picks. At the same time, in the present inventive method the bounce point position can naturally track horizons picks (see step 32), ensuring that all bounce points are located at the correct depth.

The convolution step of the present invention may be carried out efficiently in terms of organizing and utilizing computer resources in the following manner (see FIG. 4):

1. All reconstructed gathers for a single CMP line are selected, Fourier transformed in time, transposed into frequency slices, and stored on disk. (Step 41) The amount of data that needs to be stored in this step usually does not exceed 1 Tb, which is not large by modern standards.

Figure 4:
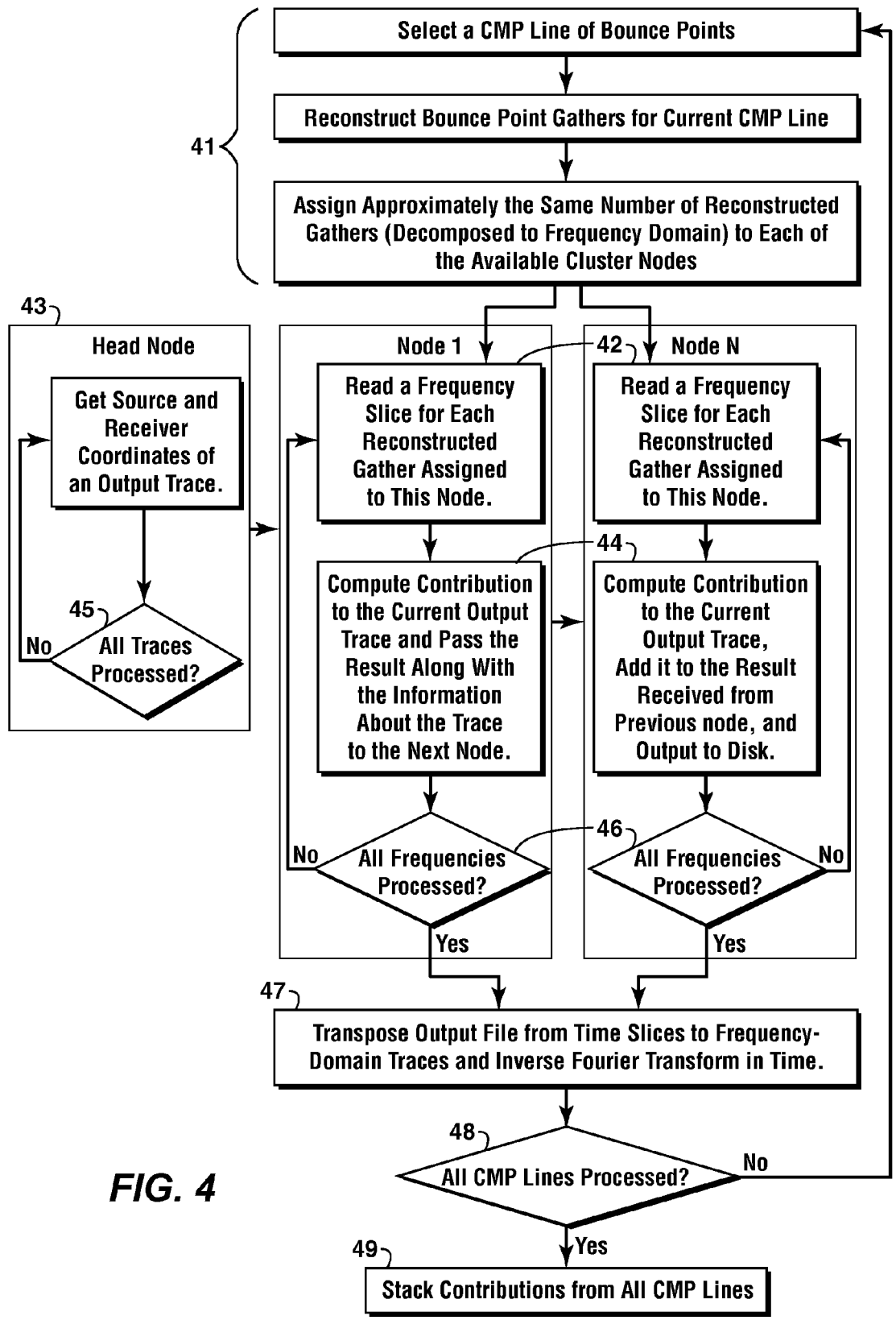
FIG. 4 is a flow chart illustrating how convolution is carried out in one embodiment of the invention.

2. A parallel program, run on a large number of CPUs, reads from disk a single frequency slice (step 42) for all the reconstructed gathers, making sure that all CPUs have approximately the same number of gathers assigned to each one of them. (FIG. 4 shows two such CPU's: Node 1 and Node N.)

3. A head node 43 pipes information about output traces through the program. It starts by sending information about a first output trace to the first CPU. The first CPU performs (step 44) the necessary convolution (multiplication of Fourier coefficients in the frequency domain) and passes the result to the second CPU. The second CPU also does the convolution, adds the result to the one received from the first CPU, and passes it on to the third CPU, etc. When the second CPU starts its convolution for the first trace, the head node sends information about a second trace to the first CPU. This process continues and once the number of traces sent by the head node reaches the number of CPUs, the "pipe" is full and all CPUs are performing convolutions in parallel.

4. Once the last CPU performs its convolution on the last trace in the reconstructed gather and adds it to the convolution results of all the previous CPUs, it outputs this final result to disk.

5. Once all the traces within the desired aperture have been processed (step 45), the process moves on to the next frequency.

6. Once all the frequencies have been processed (step 46), the file with frequency slices is transposed and inverse Fourier transformed (step 47) to obtain prediction of multiples due to the bounce points along the chosen CMP line.

7. Once all CMP lines have been processed (step 48), crossline Multiple Contribution Gathers (MCGs) are formed, examined and summed (stacked) to obtain multiple prediction for the whole dataset (step 49). A multiple contribution gather for a particular output location is made up of traces that result from computing (through convolution) contributions of various bounce points to the multiples at this location. The crossline contribution gather shows contributions of bounce points from various inlines. The multiple prediction for a given trace is obtained by summing (stacking) all traces in such gather. This final step is not treated in more detail because it is well known in the art of multiple elimination. The grid mesh spacing selected for reconstructing shot gathers at bounce points at 51 (FIG. 5) should be such that there is no aliasing in the Multiple Contribution Gather. This ensures that predicted multiples are correct and free of aliasing noise and artifacts. Also, the mesh should be wide enough to cover as many potential bounce points as feasible (in practice this means covering the whole survey area).

Figure 5:
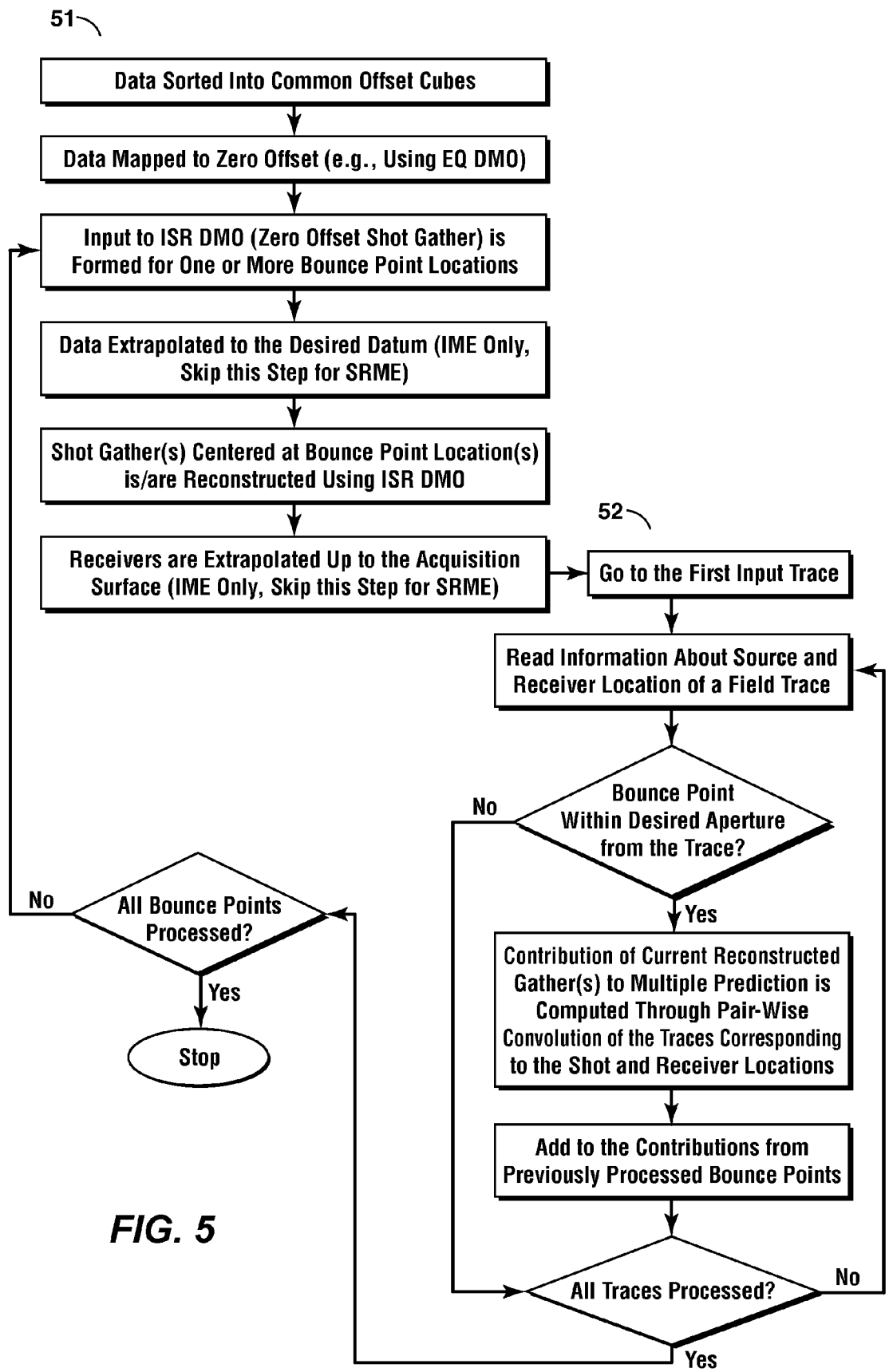
FIG. 5 is a flow chart showing basic steps in an embodiment of the present invention.

FIG. 5 is a flow chart of basic steps in an embodiment of the invention in which ISR DMO is used at 51 to regularize the seismic survey data. The features of FIG. 3 may be seen at 51, which goes a bit further in showing how both IME and SRME fit into the method. Convolution as performed in the present invention is shown at 52. The substance of the seven enumerated items just above may be found at 52, except for parallel CPU organization matters.

Example

The present inventive method was tested using a 2D synthetic dataset. An IME embodiment of the invention was selected, since SRME is just a special case of IME where downward and upward continuation are not required. Acquisition geometry used in this example is summarized in Table 1.

TABLE 1

| Acquisition geometry | |
|---|---|
| Shot spacing | 25 m |
| Receiver spacing | 25 m |
| Maximum absolute offset | 2500 m |
| Number of shots | 401 |
| Number of receivers/shot record | 201 |

Figure 6:
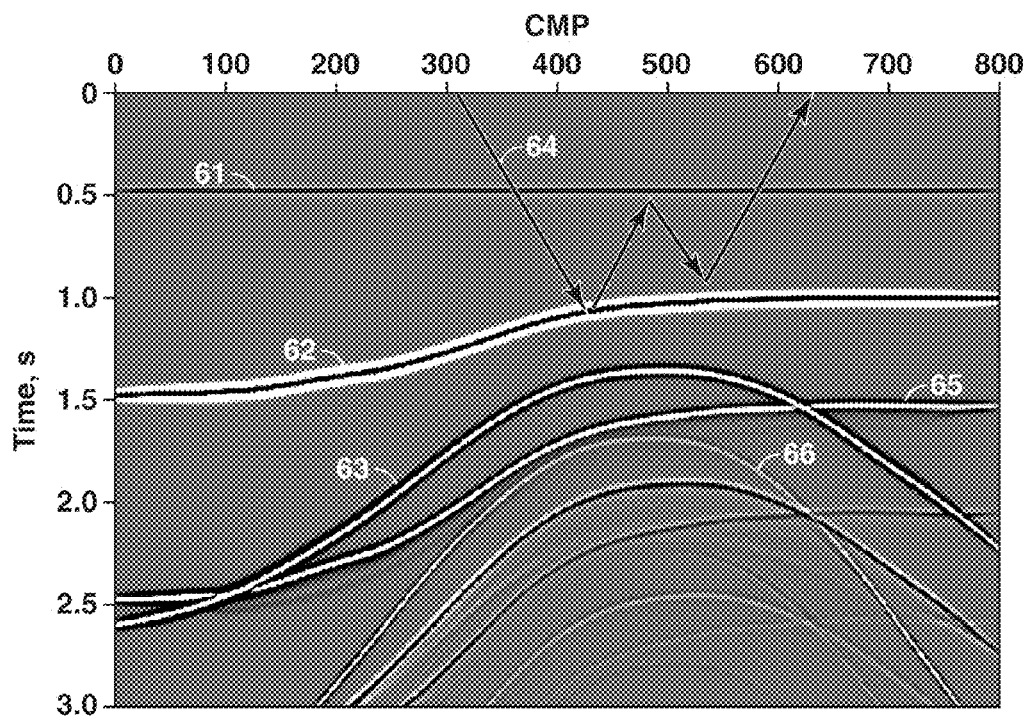

FIG. 6 shows the stack (with a $t^2$ gain applied) before multiple attenuation. The three primary reflections are indicated by 61, 62 and 63. All other events shown are internal multiple reflections. As stated above, to simplify the example, surface-related multiples were not modeled in the synthetic data set. Thus, only first, second, and third-order interbed multiples with downward reflection points on the first and second interfaces are included: for example, 65 is an interbed multiple with downward reflection points on the first interface, with the travel path similar to that shown by the series of arrows 64; and 66 is an interbed multiple with bounce points on the second interface.

Figure 7:
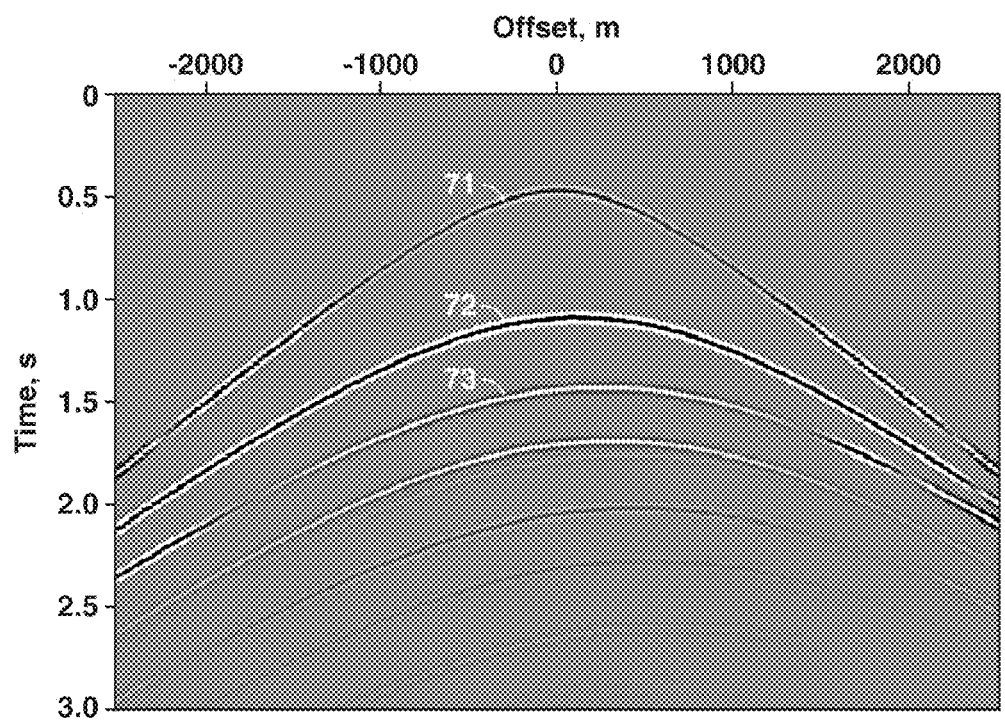
Figure 8:
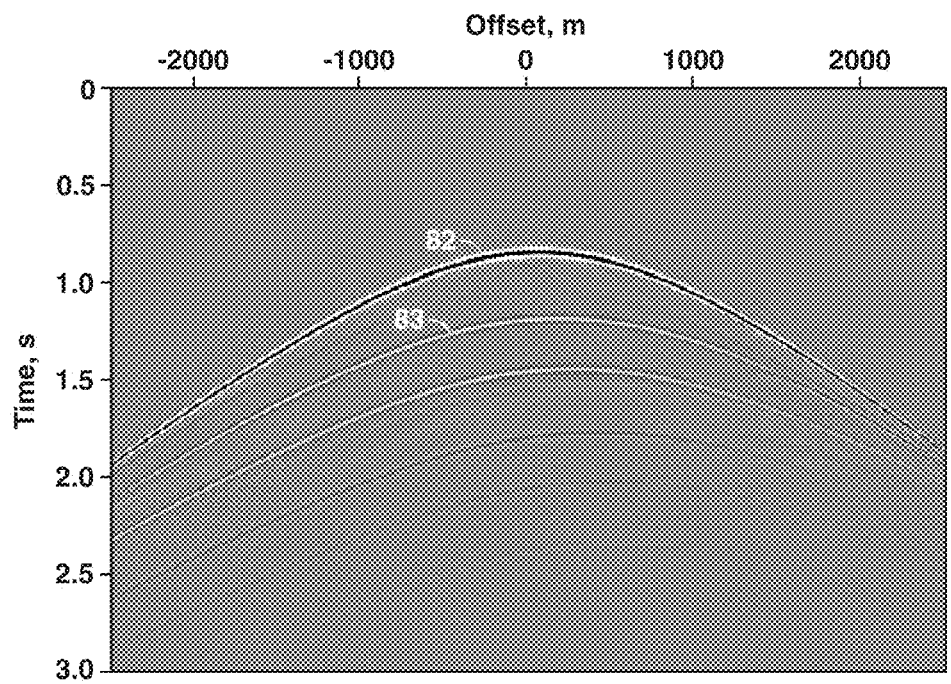
Figure 9:
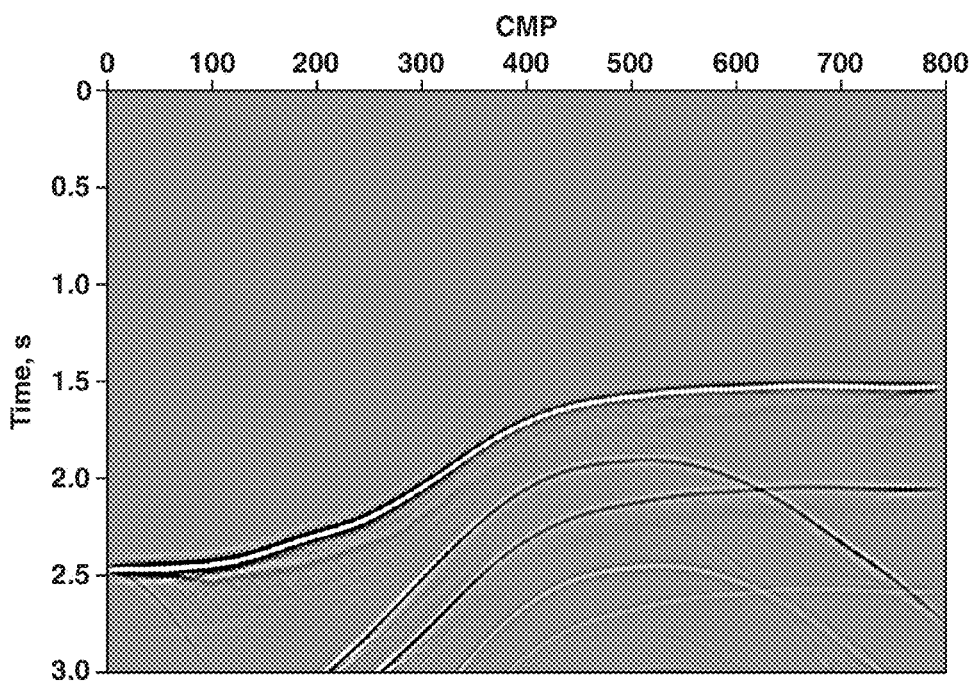
Figure 10:
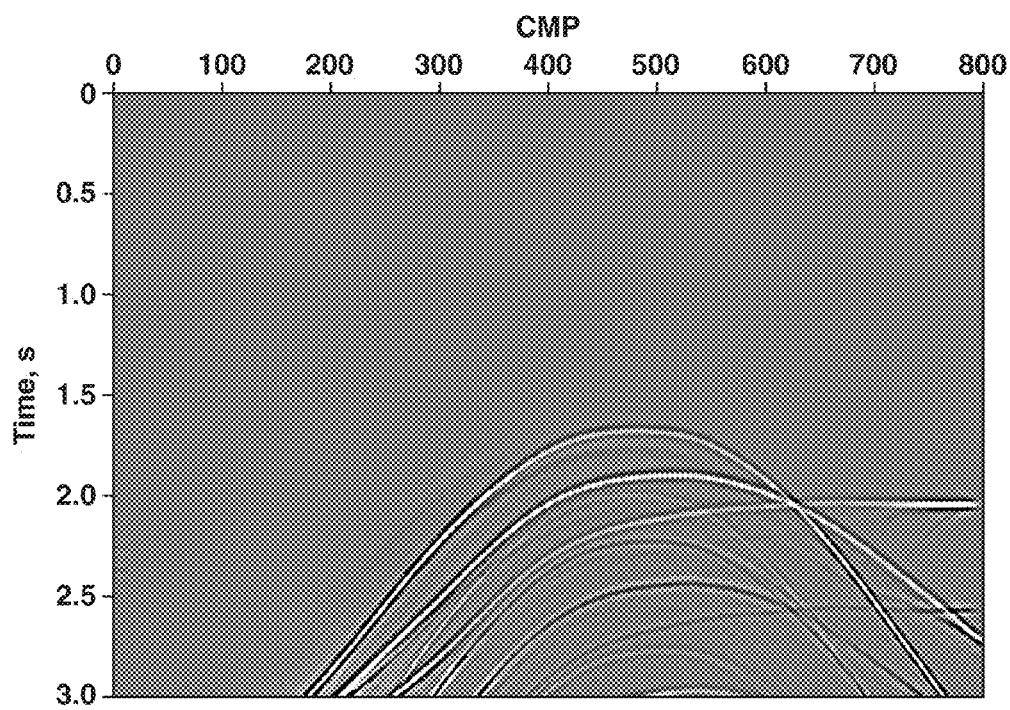
Figure 11:
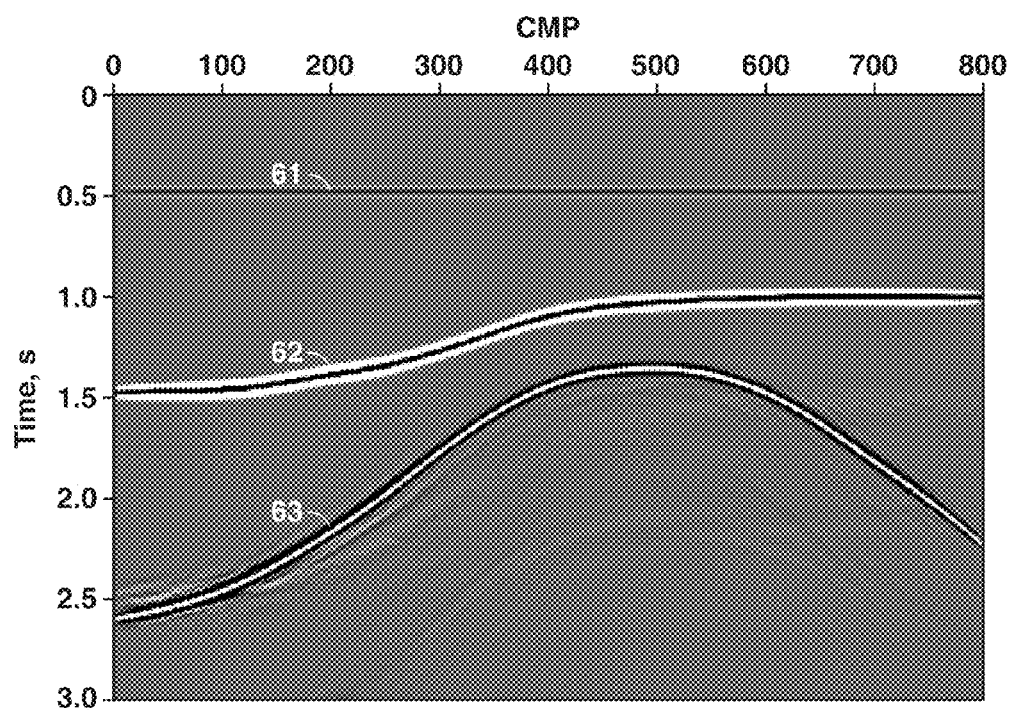

FIG. 7 shows a shot record at the center of the model. The same three primary events as in FIG. 6 are shown at 71, 72 and 73. All other events are interbed multiples. FIG. 7, when stacked with records from shots at other locations, provide the data for FIG. 6. FIG. 8 shows a gather at the same spatial location, but with the shot located on the first reflector (t=0.5 s), that was reconstructed centered at the bounce point using the procedure described above. The primary events 82 and 83 correspond to 72 and 73 in FIG. 7, but the first reflector 71 is missing from this gather (because this is where the shot is located) and all the other reflectors have moved up (compare to FIG. 7) by approximately the one-way traveltime of the first reflector, i.e., by about 0.25 s. FIG. 9 shows the stack of predicted multiples with downward reflection points at the first interface (61). They were obtained by using the data reconstruction and convolution methodology described above. FIG. 10 shows the stack of predicted multiples with downward reflection points at the second interface (62). FIG. 11 shows the results of adaptive subtraction. All interbed multiples have been suppressed, so only the three primary reflections remain from FIG. 6.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will also readily recognize that in preferred embodiments of the invention, at least some of the steps in the present inventive method are performed on a computer, i.e. the invention is computer implemented. Reconstructed gathers or multiple predictions may then be downloaded or saved to computer memory. The predicted multiple reflections may then be adaptively subtracted from the survey seismic data, and the corrected seismic data may be used to prospect for hydrocarbons.

The invention claimed is:

1. A method for eliminating multiple reflections in data from a seismic survey, comprising:
    (a) using the seismic data, reconstructing shot gathers of data at points on an (x,y) grid, said grid being selected with dense mesh spacing sufficient to distinguish potential locations of bounce points, wherein bounce points are downward reflection points of multiple reflections;
    (b) selecting a reconstructed gather corresponding to a bounce point, and data trace in the survey data, then extracting two traces from the selected reconstructed gather corresponding to the source and receiver positions of the survey data trace, and convolving them, then repeating for each survey data trace within a selected aperture, thus performing pair-wise convolution of traces from a single reconstructed gather centered at a bounce-point location;
    (c) repeating step (b) for each remaining bounce point, and summing the convolution result for each processed trace in the survey data; and
    (d) predicting multiple reflections in the survey data using the results of the preceding step.

2. The method of claim 1, further comprising Fourier transforming the reconstructed gathers in time, partitioning each into frequency slices, and performing steps (b)-(c) on the frequency domain data, one frequency slice at a time.

3. The method of claim 2, wherein the reconstructed gathers processed in step (b) are processed one common midpoint line at a time, and the multiple predictions are made by forming crossline contribution gathers showing convolution contributions of bounce points from a plurality of common midpoint lines, and summing all traces in each such crossline contribution gather.

4. The method of claim 1, wherein the reconstruction of shot gathers is performed by steps comprising:
   (a) sorting the seismic survey data into common offset cubes;
   (b) mapping each common offset cube of data to zero offset; and
   (c) reconstructing shot gathers centered at bounce point locations using inverse shot record dip move out (ISR DMO).

5. The method of claim 1, wherein the multiple reflections to be eliminated are interbed multiples, and the reconstruction of shot gathers is performed by steps comprising:
   (a) sorting the seismic survey data into common offset cubes;
   (b) mapping common offset cubes of data to zero offset;
   (c) extrapolating zero offset cubes of data down to interbed bounce point datums;
   (d) reconstructing shot gathers centered at bounce point locations using inverse shot record dip move out (ISR DMO); and
   (e) extrapolating receivers up to the survey's data acquisition surface.

6. The method of claim 5, wherein extrapolation is performed using wave equation extrapolation.

7. The method of claim 4, wherein mapping of data to zero offset is performed using equalized dip move out (EQ DMO).

8. The method of claim 1, further comprising adaptively subtracting the predicted multiple reflections from the survey data.

9. The method of claim 1, wherein predicting multiple reflections in the survey data comprises forming cross-line multiple contribution gathers and summing them to obtain predictions of multiple reflections in the survey data.

10. The method of claim 9, wherein the grid mesh spacing is selected dense enough that there is no aliasing in the multiple contribution gathers.

11. A method for prospecting for hydrocarbons, comprising:
   (a) obtaining seismic survey data;
   (b) using the seismic data, reconstructing shot gathers of data at points on an (x,y) grid, said grid being selected with dense mesh spacing sufficient to distinguish potential locations of bounce points, wherein bounce points are downward reflection points of multiple reflections;
   (c) selecting a reconstructed gather corresponding to a bounce point, and a data trace in the survey data, then extracting two traces from the selected reconstructed gather corresponding to the source and receiver positions of the survey data trace, and convolving them, then repeating for each survey data trace within a selected aperture, thus performing pair-wise convolution of traces from a single reconstructed gather centered at a bounce-point location;
   (d) repeating step (c) for each remaining bounce point, and summing the convolution result for each processed trace in the survey data;
   (e) predicting multiple reflections in the survey data using the results of the preceding step;
   (f) adaptively subtracting the predicted multiple reflections from the survey data; and
   (g) predicting whether an accumulation of hydrocarbons is present using the seismic data after correction for multiple reflection noise.

12. A method for producing hydrocarbons, comprising:
   (a) conducting a seismic survey;
   (b) obtaining a prediction of whether data from the seismic survey indicates an accumulation of hydrocarbons, said prediction having been made by a method comprising:
      (i) using the seismic data, reconstructing shot gathers of data at points on an (x,y) grid, said grid being selected with dense mesh spacing sufficient to distinguish potential locations of bounce points, wherein bounce points are downward reflection points of multiple reflections;
      (ii) selecting a reconstructed gather corresponding to a bounce point, and a data trace in the survey data, then extracting two traces from the selected reconstructed gather corresponding to the source and receiver positions of the survey data trace, and convolving them, then repeating for each survey data trace within a selected aperture, thus performing pair-wise convolution of traces from a single reconstructed gather centered at a bounce-point location;
      (iii) repeating step (ii) for each remaining bounce point, and summing the convolution result for each processed trace in the survey data;
      (iv) predicting multiple reflections in the survey data using the results of the preceding step;
      (v) adaptively subtracting the predicted multiple reflections from the survey data;
      (vi) predicting whether an accumulation of hydrocarbons is present using the seismic data after correction for multiple reflection noise; and
   (c) in response to a positive prediction, drilling a well and producing hydrocarbons.

13. A method for eliminating multiple reflection noise in data from a seismic survey, comprising:
   (a) reconstructing densely sampled gathers at a plurality of potential locations of downward reflection points of the multiple reflections;
   (b) for each reconstructed gather and each output (survey) trace, extracting two traces corresponding to the survey source and receiver positions of the output trace, then convolving the pair of extracted traces and adding the convolution results obtained for all reconstructed gathers; and
   (c) making multiple predictions for the survey based on the summed convolution results, and correcting the survey's data to eliminate multiple reflection noise.

* * * * *